United States Patent [19]
Toy

[11] Patent Number: 4,799,744
[45] Date of Patent: Jan. 24, 1989

[54] COOK'S CADDY

[76] Inventor: Sylvia S. Toy, P.O. Box 1125, Paradise, Calif. 95967

[21] Appl. No.: 137,873

[22] Filed: Dec. 24, 1987

[51] Int. Cl.$^4$ .............................................. A47B 77/06
[52] U.S. Cl. ................................... 312/229; 312/245; 211/184
[58] Field of Search ................ 312/229, 245; 248/916; 211/63, 70.7, 52, 55, 128, 184

[56] References Cited

U.S. PATENT DOCUMENTS

| D. 114,637 | 5/1939 | Heil et al. | 211/40 X |
|---|---|---|---|
| 918,186 | 4/1909 | Morse | 211/55 |
| 1,539,051 | 5/1925 | McLean | 312/229 X |
| 1,554,589 | 9/1925 | Long | 312/229 X |
| 2,944,696 | 7/1960 | Effgen | 312/229 X |
| 4,456,316 | 6/1984 | Lundgren | 312/229 |
| 4,525,882 | 7/1985 | Stenberg | 211/184 X |
| 4,552,272 | 11/1985 | Field | 211/184 X |

FOREIGN PATENT DOCUMENTS 197806  6/1978  France .................................. 312/229

Primary Examiner—Joseph Falk

[57] ABSTRACT

A compartmented kitchen utensil holding caddy having removable partitions is provided in a wall-hung or counter top container capable of holding a wide variety of separated kitchen utensils. Provisions are incorporated into the device for preventing cross contamination of soiled utensils and for removing and retaining unwanted drippings from the utensil area.

3 Claims, 2 Drawing Sheets

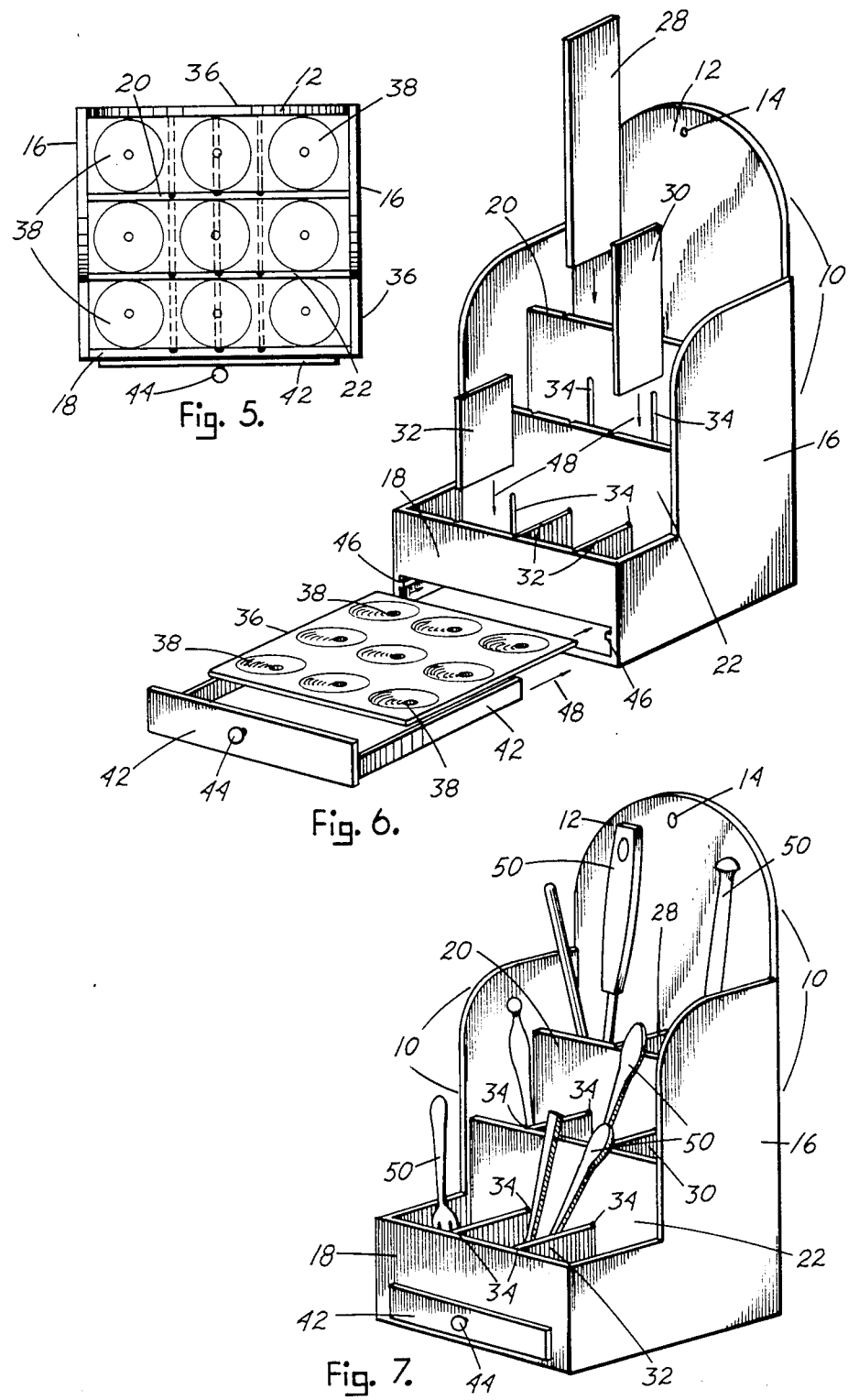

COOK'S CADDY

BACKGROUND OF THE INVENTION

1. Field of the Invention

This invention relates to kitchen utensil holders, and more particularly, to those designed to be used while cooking to hold a variety of soiled utensils. The present device contains adjustable divided partitions for use with various sized cooking implements and also contains a removable dripping's tray.

2. Description of the Prior Art

There are available, on the open market, many styles and types of kitchen utensil rests. The majority of these devices however, are designed to hold only a couple of the smaller kitchen utensils and have little or no provision for preventing cross contamination of the soiled implements with each other. My invention not only solves these problems but also has many other advantages. To the best of my knowledge, none of the current devices available to the public on the open market were in close proximity to my invention.

SUMMARY OF THE INVENTION

In practicing my invention, I have developed a plastic, rectangular kitchen utensil holder which is capable of separately holding a multiple of various sized kitchen implements. My holder can set upright on a stove shelf and other flat kitchen work surfaces or can be hung in the kitchen work area on a convenient wall. The device is especially useful when cooking several varied dishes at one time, where cross contamination of the dishes is to be prevented, such as in whipping egg whites where many contaminants prevent the egg whites from whipping properly.

Therefore, it is a primary object of my invention is to provide a kitchen utensil holder which is capable of holding many utensils.

Another object of my invention is to provide a kitchen utensil holder which allows for various sizes of utensils.

A still further object of my invention is to provide a kitchen utensil holder with adjustable, partitioned compartments which prevent cross contamination of the utensils.

An even further object of my invention is to provide a dishwasher safe kitchen utensil holder with a removable dripping's tray, designed for easier cleaning.

A still further object of my invention is to provide a heat resistant kitchen utensil holder which can sit on a horizontal surface, such as the stove top, or hang vertically on a wall.

Other objects and many advantages of my invention will be best understood by a reading of the numbered parts described in the specification and subsequent comparison with similar number parts shown in the accompanying drawings.

BRIEF DESCRIPTION OF THE DRAWINGS

FIG. 5 is a top view of the utensil holding caddy with dotted lines indicating the positions of the insertable partitions.

FIG. 6 is a perspective view of the caddy showing the insertion position of the drippings tray, utensil floor and several of the removable partitions.

FIG. 7 is a perspective view of the utensil holding caddy in use holding several sizes and varieties of kitchen implements.

Figure 1:
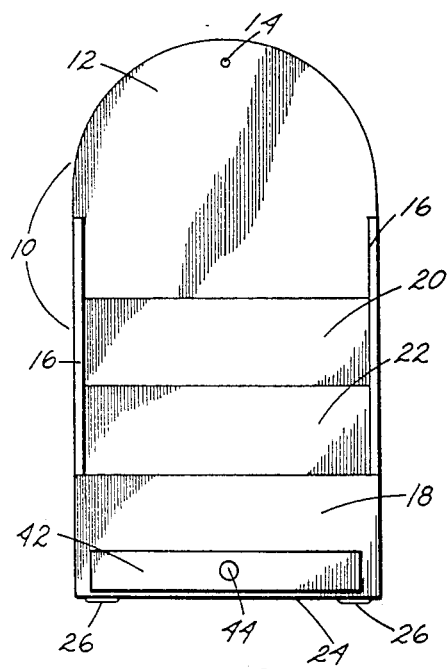
FIG. 1 is a frontal view of the preferred embodiment of the invention.

DRAWING REFERENCE NUMBERS 10 utensil holding cook's caddy
12 back wall
14 wall-hang aperture
16 side walls
18 front wall
20 inner divided wall one
22 inner divided wall two
24 housing bottom
26 leg pads
28 removable partition number one
30 removable partition number two
32 removable partition number three
34 removable partition retaining groove
36 utensil floor
38 utensil floor drainage apertures
40 utensil floor retaining grooves
42 drippings tray
44 drippings tray knob
46 drippings tray compartment
48 directional arrows
50 utensils

DESCRIPTION OF THE PREFERRED EMBODIMENT

Figure 2:
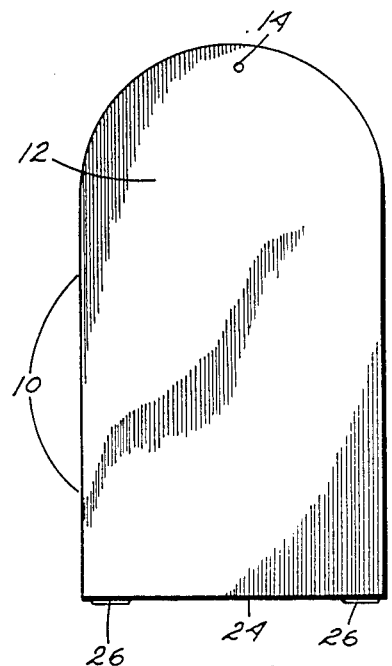
FIG. 2 shows a rear view of the FIG. 1 illustration.
Figure 3:
FIG. 3 a cross sectional view of the funnel apertured removable utensil floor.
Figure 4:
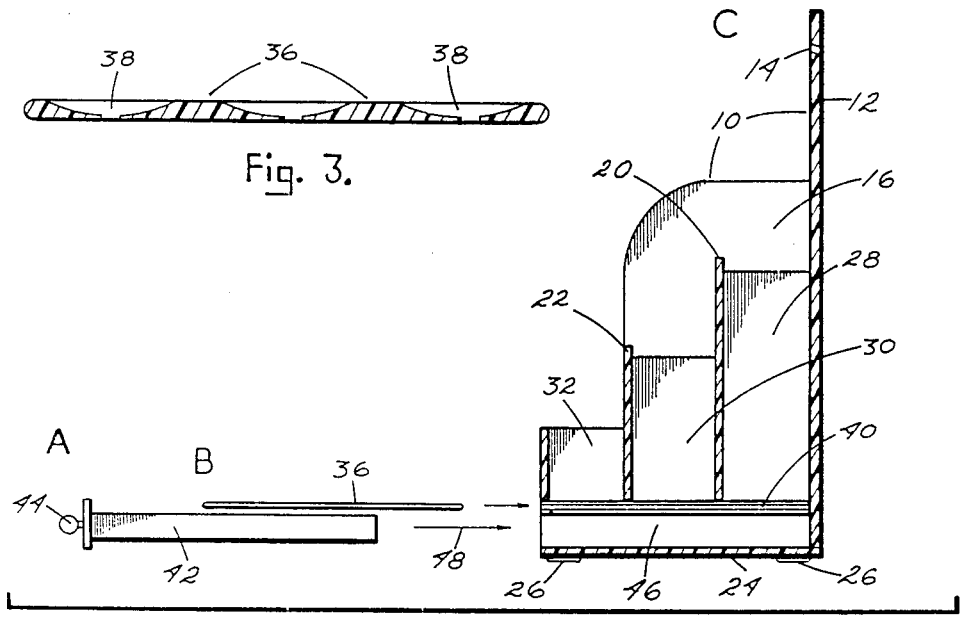
FIG. 4 is a side view of the drippings tray, B is a side view of the utensil floor, and C is a cross sectional side view of the utensil holding caddy housing.

Referring now to the drawings at FIG. 1 where the preferred embodiment of the invention is illustrated in a frontal view showing the rectangular utensil holding cook's caddy 10 in vertical use position. Back wall 12 with a rounded top portion, also shown in FIG. 2, has wall-hang aperture 14 positioned centrally at the top. Utensil holding caddy 10 is a partitioned enclosure structured of back wall 12, two shorter side walls 16, an even shorter front wall 18, and a bottom 24 all shown in FIG. 4, FIG. 6, and FIG. 7. This arrangement leaves the majority of the top and front portion of the device open. Utensil holding caddy 10 has two permanent interior walls positioned parallel to back wall 12. They are inner divided wall one 20, almost as tall as side wall 16, and inner divided wall two 22, which is approximately half as tall as side wall 16, shown in FIG. 4 C. Both inner divided walls 20 and 22 along with back wall 12, side walls 16 and front wall 18, form three separate compartments of equal width and length, also shown in FIG. 4 C. These three compartments can be further sectioned off by one to three of the removable partition number one 28 which is positioned at a right angle between back wall 12 and inner divided wall one 20. The second compartment is sectioned by one to three of the removable partition number two 30, which is positioned at a right angle between inner divided wall one 20 and inner divided wall two 22. The third and smallest chamber is partitioned by one to three of the removable partition number three 32 which is positioned at a right angle to inner divided wall two 22, and front wall 18, all shown in side views in FIG. 4 C, and perspectively in FIG. 6. Three removable partition retaining grooves 34 are incorporated into the interior surface of back wall 12, both sides of inner divided wall one 20, both sides of inner divided wall two 22, and the interior side of front wall 18, which help to retain all the removable partitions in place, as shown in FIG. 6. Utensil floor 36 is located beneath the inner divided walls one 20 and two 22 and contains utensil floor funnelled drainage apertures 38, illustrated in FIG. 3. Utensil floor 36 is removably retained in place by utensil floor retaining grooves 40, which are located on the interior sides of side walls 16, as seen in FIG. 4 C. Drippings tray 42 is removably located beneath utensil floor 36 within drippings tray housing 46, and is sized slightly smaller than bottom 24, also shown in FIG. 4 C. Various sizes and shapes of kitchen utensils 50 are placed within separate compartments formed by the inner partitions and walls of the utensil holder housing 10, pictured in FIG. 7. Drippings from soiled utensils 50 flow down and out funnelled utensil floor drainage apertures 38 into drippings tray 42, which can be easily removed and emptied.

Although I have described my invention in detail in the specification, the drawings are to be considered illustrative and not restrictive in character, it being understood that only the preferred embodiment of the invention has been shown and that all changes and modifications that fall within the scope of the appended claims are desired to be protected.

I claim:

1. A multiple kitchen utensil holding caddy comprising:
a substantially rectangular container structured for vertical positioning, upwardly arranged with an opened top, downwardly arranged terminally with a flat bottom, there being corner positioned supporting leg pads affixed externally under said flat bottom with said container compartmented for depository housing of kitchen utensils, there being an elongated, rectangular back section with a semicircular top edge containing a downwardly angled wallhang aperture positioned centrally adjacent said top edge and said back section affixed with side walls extending upward from said bottom to the horizontal diametrical apex of said semicircle of said back section with said side walls having quarter rounded upwardly positioned frontal corners, there being two stepped down dividers paralleling said back wall between said side walls, the highest of said dividers nearest said back wall and the lowest of said dividers being a partial frontal wall section for said side walls, there being a box-like frontal extension of said side walls affixed with a shortened front member sufficiently sized to form a third step down divider in the back wall paralleling divider design, there being removable partitions sized for height and width fitting between said divider walls forming said compartments and said shortened front member accommodating a pull-out drip tray housed paralleling said bottom under downwardly terminal ends of said back wall paralleling dividers and said removable partitions, there being a drip pan member multi-apertured with funneling features slidably affixed immediately above said pull-out drip tray.

2. The kitchen utensil holding caddy defined in claim 1 wherein said removable partitions are retained slidably between said dividers by one vertically aligned edge on each of said partitions beveled and fitting into slide groves cut vertically in the interfaced surfaces of each smaller said divider and the other vertically aligned edge concaved to encompass a track-like protrusion extending upwardly from lower terminal ends in said higher divider interfaced surfaces to a height compatible with said grooves in said smaller divider interfaced surface, there being like retainers for said removable partitions between said back wall and said highest divider.

3. The kitchen utensil holding caddy defined in claim 1 wherein said funneling features in said drip pan member multi-apertured are concave indentations with said apertures centrally positioned therein.

* * * * *